H. W. Shepard,
Can Bottom.
No. 4,032. Reissued June 14. 1870.
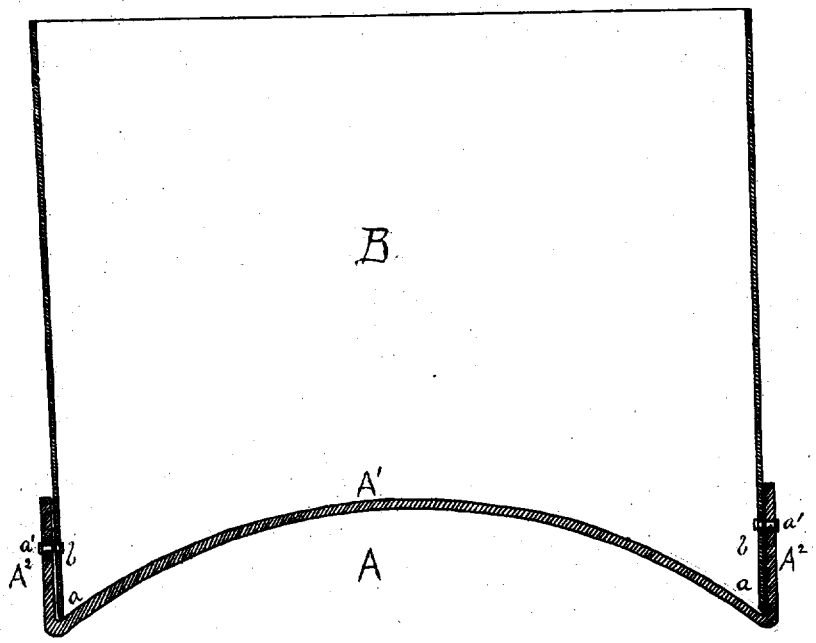
WITNESSES.
Edwin James.
A. Holmead Jr
INVENTOR.
H. W. Shepard.
per J. E. F. Holmead
Attorney.
N. PETERS, PHOTO-LITHOGRAPHER, WASHINGTON, D. C.

UNITED STATES PATENT OFFICE.

HENRY W. SHEPARD, OF MANNSVILLE, AND ROBERT SEAMAN, OF NEW YORK, N. Y., ASSIGNEES OF HENRY W. SHEPARD.

IMPROVEMENT IN METALLIC CAN-BOTTOMS.

Specification forming part of Letters Patent No. 98,526, dated January 4, 1870; Reissue No. 4,032, dated June 14, 1870.

*To all whom it may concern:*

Be it known that HENRY W. SHEPARD, of Mannsville, in the county of Jefferson and State of New York, invented certain new and useful Improvements in Metallic Can-Bottoms, on which Letters Patent of the United States were granted bearing date January 4, 1870, and numbered 98,526; that one-half interest in said Letters Patent has been assigned by HENRY W. SHEPARD to ROBERT SEAMAN, of New York city, in the county of New York and State of New York; and that the following is a full, clear, and exact description of said invention, reference being had to the accompanying drawing, and to the letters of reference marked thereon, making part of this specification, in which is represented a horizontal vertical section of the can-bottom.

The nature of the invention, and which is a new article of manufacture, consists in forming a metallic can-bottom in one piece, whether by stamping or otherwise. The surface or base of the bottom is to be convexed or curved and surrounded by a vertical annular rim.

The advantages of this construction will readily suggest themselves. Owing to the arch shape of the bottom resulting from its convexed or curved formation, the requisite strength is secured without rendering the bottom unduly heavy, while the vertical annular rim affords a convenient and permanent support for the base of the cylinder or body of the can, and one to which it can readily be attached.

To enable others skilled in the art to make and use the invention, we will now proceed to describe its construction and operation.

A is the bottom, made in one piece and of any suitable metal. We usually stamp them out of iron plates or sheets known to the trade as "No. 16," which possess the requisite strength, and are of adequate weight to retain the can in a vertical and steady position when being transported in an empty condition. The surface A′ of the bottom is of convexed form, as clearly shown in the drawing. The degree of this convexity may be slightly varied. The advantages of this convexed over any other form are twofold; first, the arch formation insures the desired degree of strength without being unduly heavy or cumbersome; and, again, it forms at its point of union with the rim or flange $A^2$ an open recess, *a*, which is most desirable, and in which is seated the cylinder B. The rim or flange $A^2$ is vertical and perfectly straight, so that when the cylinder is inserted and secured a can of uniform diameter throughout shall result.

B is the cylinder, and is made in the usual manner and of suitable metal. It is seated in the recess *a* and firmly secured by rivets *a′ a′* and solder.

It will be observed by reference to the drawing that the bottom, rim, and lower section, *b*, of the cylinder are entirely protected by the heavy metal bottom, the flange $A^2$ not only affording a convenient bearing-surface for the cylinder to be attached to, but also furnishing a strong hard-metal hoop, so that when the cans are pushed together the seam-joint is not only entirely protected, but no portion of the cans save these flanged hoops can come in contact; and as these are of such material as not to be bruised or indented, all danger of injury to the can is avoided. The great advantage of this open recess *a* is found in the fact that the can, after being emptied, is so readily cleaned, and can thus be always kept perfectly pure. The iron bottoms thus formed are tinned by the usual process.

Having thus fully described the invention, what is claimed therein as new, and desired to be secured by Letters Patent of the United States, is—

As a new article of manufacture, the can-bottom A, when constructed in one piece, consisting of the curved surface A′ and vertical annular rim $A^2$, substantially as described.

In testimony whereof we have signed our names to this specification before two subscribing witnesses.

H. W. SHEPARD.
ROBT. SEAMAN.

Witnesses:
ED. P. GODDARD,
S. D. CLARK.